United States Patent
Gilmour

(10) Patent No.: US 11,373,686 B1
(45) Date of Patent: Jun. 28, 2022

(54) SYSTEMS AND METHODS FOR REMOVING COMMANDS FROM SOUND RECORDINGS

(71) Applicant: GoPro, Inc., San Mateo, CA (US)

(72) Inventor: Nicholas Ryan Gilmour, San Jose, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/129,353

(22) Filed: Dec. 21, 2020

Related U.S. Application Data

(60) Provisional application No. 62/952,581, filed on Dec. 23, 2019.

(51) Int. Cl.
  *G11B 27/34* (2006.01)
  *G11B 27/031* (2006.01)
  *H04N 5/232* (2006.01)
  *G06F 3/16* (2006.01)
  *G10L 15/22* (2006.01)

(52) U.S. Cl.
  CPC ............ *G11B 27/031* (2013.01); *G06F 3/165* (2013.01); *G10L 15/22* (2013.01); *H04N 5/23203* (2013.01); *G10L 2015/223* (2013.01)

(58) Field of Classification Search
  None
  See application file for complete search history.

(56) References Cited

U.S. PATENT DOCUMENTS

| | | | |
|---|---|---|---|
| 2003/0138118 A1* | 7/2003 | Stahl | G10L 15/26 381/107 |
| 2010/0281375 A1* | 11/2010 | Pendergast | G11B 27/34 715/723 |
| 2017/0019580 A1* | 1/2017 | Boghosian | G11B 27/031 |
| 2017/0272784 A1* | 9/2017 | Shang | H04N 21/6332 |
| 2020/0105274 A1* | 4/2020 | Joller | G10L 25/81 |

\* cited by examiner

*Primary Examiner* — Eileen M Adams
(74) *Attorney, Agent, or Firm* — Esplin & Associates, PC

(57) ABSTRACT

An image capture device may capture voice commands during capture of video. Voice commands may be located within the audio of the video, and the presence of the voice commands may be reduced.

20 Claims, 6 Drawing Sheets

SYSTEMS AND METHODS FOR REMOVING COMMANDS FROM SOUND RECORDINGS

FIELD

This disclosure relates to modifying audio content to reduce presence of voice command within the audio content.

BACKGROUND

One or more voice commands may be used to cause operations of an image capture device during capture of a video. Inclusion of such voice command(s) within the video may be distracting and/or undesirable.

SUMMARY

This disclosure relates to removing commands from sound recordings. Visual information, audio information, and/or other information may be obtained. The visual information may define visual content captured by one or more image sensors of an image capture device during a capture duration. The audio information may define audio content captured by one or more sound sensors of the image capture device during the capture duration. One or more voice commands may be located within the audio content. The voice command(s) may be associated with one or more operations of the image capture device. The audio content may be modified to reduce presence of the voice command(s) within the audio content. Video content of a video may be generated. The video content may include the visual content, the modified audio content, and/or other content.

A system that removes commands from sound recordings may include one or more electronic storages, one or more processors, and/or other components. An electronic storage may store visual information defining visual content, information relating to visual content, audio information, information relating to audio content, information relating to voice commands, information relating to reducing presence of voice commands within audio content, information relating to modified audio content, and/or other information. In some implementations, the system may include one or more optical elements, one or more image sensors, one or more sound sensors, and/or other components.

One or more components of the system may be carried by a housing, such as a housing of an image capture device. For example, the optical element(s), the image sensor(s), and/or the sound sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate removing commands from sound recordings. The machine-readable instructions may include one or more computer program components. The computer program components may include one or more of a visual information component, an audio information component, a voice command component, a modification component, a generation component, and/or other computer program components.

The visual information component may be configured to obtain visual information and/or other information. The visual information may define visual content captured by one or more image sensors of an image capture device. The visual content may be captured during one or more capture durations.

The audio information component may be configured to obtain audio information and/or other information. The audio information may define audio content captured by one or more sound sensors of the image capture device. The audio content may be captured during the capture duration(s).

The voice command component may be configured to locate one or more voice commands within the audio content. The voice command(s) may be associated with one or more operations of the image capture device. In some implementations, a voice command may cause one or more capture operations of the image capture device. In some implementations, a voice command may cause one or more changes in one or more capture operations of the image capture device. In some implementations, a voice command may cause one or more highlight tags to be generated.

The modification component may be configured to modify the audio content and/or other content. The audio content may be modified to reduce presence of the voice command(s) within the audio content. In some implementations, the presence of the voice command(s) within the audio content may be reduced based on filtering. In some implementations, reducing the presence of the voice command(s) within the audio content may include removing the voice command(s) from the audio content. In some implementations, reducing the presence of the voice command(s) within the audio content may include reducing volume and/or energy of the voice command(s) within the audio content. In some implementations, reducing the presence of the voice command(s) within the audio content may include increasing volume and/or energy of music for the video. In some implementations, reducing the presence of the voice command(s) within the audio content may include reducing volume and/or energy of the audio content while maintaining or increasing volume and/or energy of music for the video.

In some implementations, the audio content may have a progress length, and reducing the presence of the voice command(s) within the audio content may include removing one or more portions of the audio content including the voice command(s) responsive to the voice command(s) being located at a beginning part and/or an ending part of the progress length. In some implementations, the audio content may be further modified to include a fade-in effect based on the voice command(s) being located at the beginning part of the progress length and/or other information. In some implementations, the audio content may be further modified to include a fade-out effect based on the voice command(s) being located at the ending part of the progress length.

The generation component may be configured to generate video content of a video. The video content may include the visual content, the modified audio content, and/or other content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
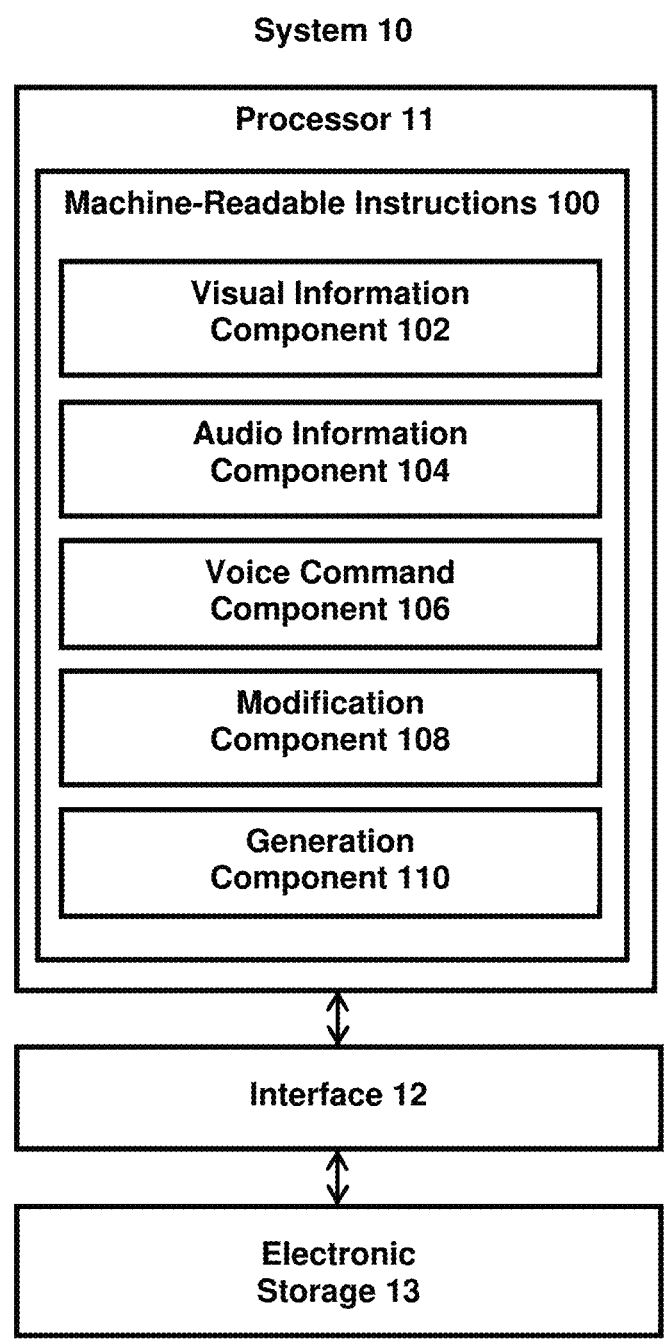
FIG. 1 illustrates an example system that removes commands from sound recordings.

FIG. 1 illustrates a system 10 for removing commands from sound recordings. The system 10 may include one or more of a processor 11, an interface 12 (e.g., bus, wireless interface), an electronic storage 13, and/or other components. In some implementations, the system 10 may include one or more optical elements, one or more image sensors, one or more sound sensors, and/or other components. Visual information, audio information, and/or other information may be obtained by the processor 11. The visual information may define visual content captured by one or more image sensors of an image capture device during a capture duration. The audio information may define audio content captured by one or more sound sensors of the image capture device during the capture duration. One or more voice commands may be located within the audio content by the processor 11. The voice command(s) may be associated with one or more operations of the image capture device. The audio content may be modified by the processor 11 to reduce presence of the voice command(s) within the audio content. Video content of a video may be generated by the processor 11. The video content may include the visual content, the modified audio content, and/or other content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, audio information, information relating to audio content, information relating to voice commands, information relating to reducing presence of voice commands within audio content, information relating to modified audio content, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, optical element(s), image sensor(s), and/or sound sensor(s), of the system 10 may be carried by the housing of the image capture device. The housing may carry other components, such as the processor 11 and/or the electronic storage 13.

Figure 3:
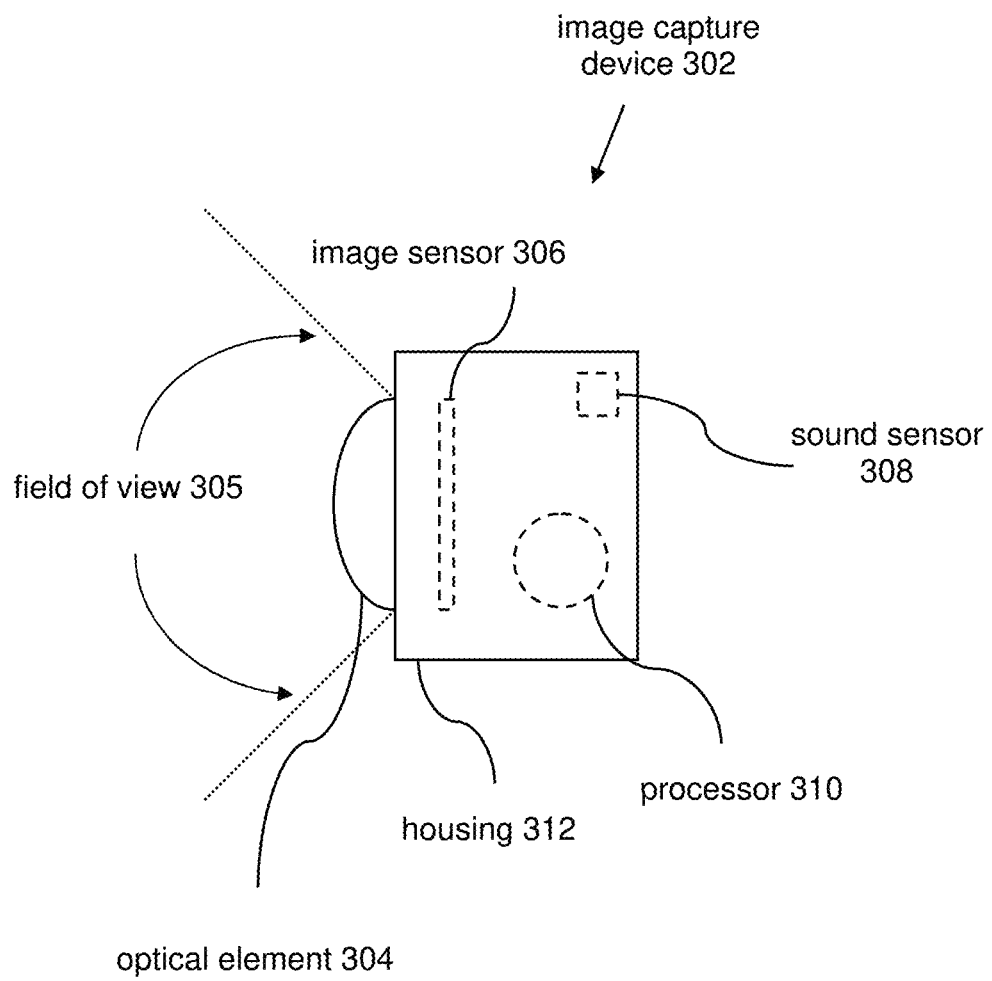
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a sound sensor 308, a processor 310, and/or other components. One or more components of the image capture device 302 may be the same as, be similar to, and/or correspond to one or more components of the system 10. For example, he processor 308 may be the same as, be similar to, and/or correspond to the processor 11. The image capture device 302 may include other components not shown in FIG. 3 The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The sound sensor 308 include sensor(s) (e.g., microphone, component(s) of microphone) that converts received sounds into output signals. The output signals may include electrical signals. The sound sensor 308 may generate output signals conveying information based on sounds received by the sound sensor 308. For example, sound sensor 308 may be configured to generate a sound output signal conveying audio information based on the received sounds. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats. The audio information may be stored in one or more locations, such as an electronic storage, storage of the sound sensor 308, remote storage, and/or other locations. While the sound sensor 308 is shown to be carried by the housing 312 in FIG. 3, this is merely an example and is not meant to be limiting. The sound sensor 308 may be remote/separate from the image capture device 302.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), facilitate operation of the image sensor 306 (e.g., change how the received light is converted into information that defines images/videos and/or how the images/videos are post-processed after capture), and/or facilitate operation of the sound sensor 308 (e.g., change how the received sound is converted into information that defines audio content and/or how the audio content post-processed after capture).

The processor 310 may obtain information from the image sensor 306 and/or the sound sensor 308, and/or facilitate transfer of information from the image sensor 306 and/or the sound sensor 308 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The image capture device 302 may capture visual content and audio content during a capture duration. The visual content, the audio content, and/or other content may be captured by the image capture device 302 for generation of video content. One or more voice commands may be located within the audio content. The audio content may be modified to reduce the presence of the voice command(s) within the audio content. The visual content and the modified audio content may be used to generate video content of a video. For example, visual content may be used to generate video frames of the video, and the modified audio content may provide audio for playback of some or all of the video frames of the video.

Referring back to FIG. 1, the processor 11 (or one or more components of the processor 11) may be configured to obtain information to facilitate removing commands from sound recordings. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a sound sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate removing commands from sound recordings. The machine-readable instructions 100 may include one or more computer program components. The machine-readable instructions 100 may include one or more of a visual information component 102, an audio information component 104, a voice command component 106, a modification component 108, a generation component 110, and/or other computer program components.

The visual information component 102 may be configured to obtain visual information and/or other information. Obtaining visual information may include one or more of accessing, acquiring, analyzing, determining, examining, identifying, loading, locating, opening, receiving, retrieving, reviewing, selecting, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations. The visual information component 102 may obtain visual information from one or more hardware components (e.g., an image sensor) and/or one or more software components (e.g., software running on a computing device).

Visual information may be obtained during acquisition of the visual content and/or after acquisition of the visual content by one or more image capture devices. For example, the visual information component 102 may obtain visual information defining visual content while the visual content is being captured by an image capture device. The visual information component 102 may obtain visual information defining visual content after the visual content has been captured and stored in memory (e.g., the electronic storage 13).

In some implementations, the visual information component 102 may obtain visual information based on user interaction with a user interface/application (e.g., video/image editing application, video player/image viewer application), and/or other information. For example, a user interface/application may provide option(s) for a user to select one or more visual content from which video content is to be generated. The visual information defining the visual content may be obtained based on the user's selection of the visual content through the user interface/application. Other selections of visual content for retrieval of visual information are contemplated.

The visual information may define visual content captured by one or more image sensors of an image capture device. For example, the visual information may define visual content captured by the image sensor 306 of the image capture device 302. The visual content may be captured during one or more capture durations. The visual content may have a progress length. The progress length of the visual content may be same as and/or determined based on the capture duration(s). For example, the progress length of the visual content may be the same as the capture duration(s) (total length of capture duration(s)) based on the capture rate (e.g., capture FPS) being the same as the playback rate (e.g., playback FPS). The progress length of the visual content may be different from the capture duration(s) based on the capture rate being different form the playback rate (e.g., fraction/multiple of the total length of the capture duration(s)). The visual content may be defined by the visual information as a function of progress through the progress length. For example, the visual information may define visual content of images/video frames, with the images/video frames being associated with different moments within the progress length.

The audio information component 104 may be configured to obtain audio information and/or other information. Obtaining audio information may include one or more of accessing, acquiring, analyzing, determining, examining, identifying, loading, locating, opening, receiving, retrieving, reviewing, selecting, storing, and/or otherwise obtaining the audio information. The audio information component 104 may obtain audio information from one or more locations. For example, the audio information component 104 may obtain audio information from a storage location, such as the electronic storage 13, electronic storage of information and/or signals generated by one or more sensors, electronic storage of a device accessible via a network, and/or other locations. The audio information component 104 may obtain audio information from one or more hardware components (e.g., a sound sensor) and/or one or more software components (e.g., software running on a computing device).

Audio information may be obtained during acquisition of the audio content and/or after acquisition of the audio content by one or more sound sensors. For example, the audio information component 104 may obtain audio information defining audio content while the audio content is being captured by a sound sensor. The audio information component 104 may obtain audio information defining audio content after the audio content has been captured and stored in memory (e.g., the electronic storage 13).

In some implementations, the audio information component 104 may obtain audio information based on user interaction with a user interface/application (e.g., video/image editing application, video player/image viewer application), and/or other information. For example, a user interface/application may provide option(s) for a user to select one or more audio content from which video content is to be generated. The audio information defining the audio content may be obtained based on the user's selection of the audio content through the user interface/application. Other selections of audio content for retrieval of audio information are contemplated.

The audio information may define audio content captured by one or more sound sensors. For example, the audio information may define audio content captured by sound sensor(s) of the image capture device. For instance, the audio information may define audio content captured by the sound sensor 308 of the image capture device 302. The audio content may be captured during one or more capture durations. The audio content may be captured during capture duration(s) in which visual content is captured. Some or all of the audio content may be captured concurrently with the visual content. That is, the capture duration(s) of the audio content may be the same as or overlap with the capture duration(s) of the visual content. For example, the image capture device 302 may concurrently capture visual content and audio content using the image sensor 306 and the sound sensor 308, respectively.

The audio content may have a progress length. The progress length of the audio content may be same as and/or determined based on the capture duration(s). For example, the progress length of the audio content may be the same as the capture duration(s) (total length of capture duration(s)) based on the capture rate being the same as the playback rate. The progress length of the audio content may be different from the capture duration(s) based on the capture rate being different form the playback rate. The audio content may be defined by the audio information as a function of progress through the progress length. For example, the audio information may define recorded sounds, with different time portions of recorded sounds being associated with different moments within the progress length.

The voice command component 106 may be configured to locate one or more voice commands within the audio content. Locating a voice command within the audio content may include determining which time portions of the audio content includes the voice command. Locating a voice command within the audio content having a progress length may include determining which portions of the progress length includes recording of the voice command. Locating a voice command within the audio content may include determining which time point or a time duration within the progress length the voice command is recorded and/or detected.

The voice command component 106 may locate a voice command within the audio content based on analysis of the audio content and/or other information. Analysis of the audio content may include examination, evaluation, processing, studying, and/or other analysis of the audio content. For example, analysis of the audio content may include examination, evaluation, processing, studying, and/or other analysis of one or more features/characteristics of the audio content. For instance, analysis of the audio content may include and/or may utilize framing, windowing, feature extraction, linear predictive coding, perceptual linear prediction, relative spectral filtering, Mel frequency cepstral coefficient, and/or classifier (e.g., hidden Markov model, neural network, dynamic time warping, vector quantization. Use of other techniques to locate voice command(s) within the audio content are contemplated.

A voice command may be associated with one or more operations of an image capture device. A voice command may refer to one or more words, phrases, sounds, and/or other audible commands that is associated with the operation(s) of the image capture device. Detection of the voice command by the image capture device may cause the image capture device to perform the associated operation(s). A voice command may be recorded and/or detected by one or more sound sensors, such as a sound sensor of the image capture device. Audio content may include a voice command based on the voice command being spoken during capture duration of the audio content. The audio content may include recording of words, phrases, sounds, and/or other audible commands that is spoken by one or more persons while a sound sensor is recording the audio content. In some implementations, multiple voice commands may be associated with the same operation(s) of the image capture device. In some implementations, different voice commands may be associated with different operations of the image capture device.

In some implementations, a voice command may be associated with and/or cause one or more capture operations of the image capture device. A capture operation of the image capture device may refer to an operation of the image capture device relating to capturing visual content, audio content, and/or other content. For example, a voice command may be associated with and/or cause the image capture device to operate to start capturing visual content, audio content, and/or other content. For instance, detection of the phase "start recording" or "capture" may cause the image capture device to start recording visual content and/or audio content. A voice command may be associated with and/or cause the image capture device to operate to stop capturing visual content, audio content, and/or other content. For instance, detection of the phase "stop recording" or "stop capture" may cause the image capture device to stop recording visual content and/or audio content.

A voice command may be associated with and/or cause particular type of content capture. For example, detection of the phrase "take a photo" may cause the image capture device to record visual content for a single image while detection of the phrase "shoot burst" may cause the image capture device to record visual content for multiple image. Detection of the phase "start time lapse" or "stop time lapse" may cause the image capture device to operate to start or stop capturing visual content, audio content, and/or other content to generate time-lapse video. Other voice commands for capture operations of the image capture device are contemplated.

In some implementations, a voice command may be associated with and/or cause one or more changes in one or more capture operations of the image capture device. A change in a capture operation may refer to a change in how the capture operation is performed by the image capture device. For example, a voice command may be associated with and/or cause change in settings of the image capture device in capturing visual content, audio content, and/or other content. For instance, detection of a voice command may cause the image capture device to change image capture resolution, image capture frame rate, audio capture quality, audio capture rate, field of view (zoom), mode of operation, and/or other operation of the image capture device. Other voice commands for changing capture operations of the image capture device are contemplated.

In some implementations, a voice command may be associated with and/or cause one or more highlight tags to be generated. A highlight tag may refer to a tag that identifies and/or designates occurrences of highlights during content capture. A highlight may refer to a part of an event or a period of time that is of interest to one or more users (e.g., events of interest)). A highlight tag may include information on location of the occurrence of the highlight within the capture duration/progress length, information on extent of the visual content that depicts the highlight, information on the type of highlight, and/or other information. For example, detection of particular phase (e.g., "highlight," "wow," "that was sick"), detection of particular type and/or level of sound (e.g., cheering) may cause the image capture device to mark a particular moment in the capture duration/progress length as a moment at which an event of interest occurred. Other voice commands for generations of highlight tags are contemplated.

Figure 4A:
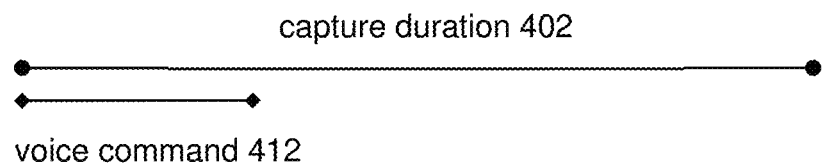
FIGS. 4A, 4B, and 4C illustrate example voice commands within capture durations.
Figure 4B:
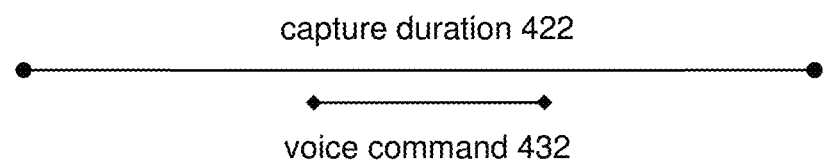
Figure 4C:
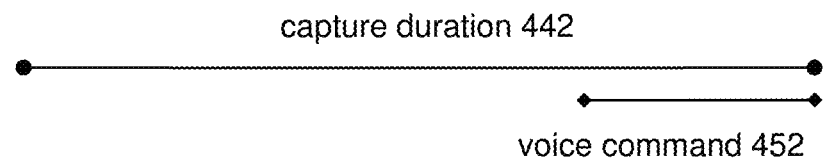

FIGS. 4A, 4B, and 4C illustrate example voice commands within capture durations. In FIG. 4A, a voice command 412 may be located within a beginning part of a capture duration 402. For example, the voice command 412 may have been spoken by a person and recorded by a sound sensor when the capture of visual content and/or audio content began. In FIG. 4B, a voice command 432 may be located within a middle part of a capture duration 422. For example, the voice command 432 may have been spoken by a person and recorded by a sound sensor in the middle of capture of visual content and/or audio content. In FIG. 4C, a voice command 452 may be located within an ending part of a capture duration 442. For example, the voice command 452 may have been spoken by a person and recorded by a sound sensor at/near the end of the capture of visual content and/or audio content. Other locations of voice commands within the audio content are contemplated.

The modification component 108 may be configured to modify the audio content and/or other content. Modifying audio content may include making changes to the audio content and/or other content associated with the audio content. Modifying audio content may include decreasing one or more features of the audio content, increasing one or more features of the audio content, removing one or more features of the audio content, adding one or more features to the audio content, and/or other changes to the audio content. The audio content may be modified to reduce presence of the voice command(s) within the audio content. Reducing presence of a voice command within the audio content may include decreasing impact of the voice command within the audio content. Reducing presence of a voice command within the audio content may include eliminating the voice command from the audio content and/or reducing impact of voice command within the audio content. In some implementations, the presence of the voice command(s) within the audio content may be reduced based on filtering. For example, the voice command may be reduced based on filtering of sounds with human voice frequency located within the audio content at the corresponding moment.

Figure 5A:
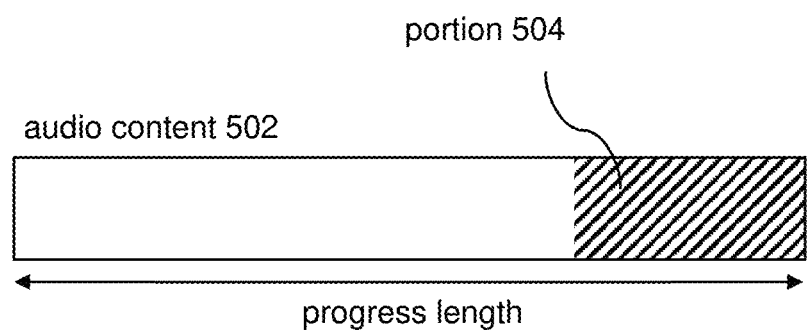
FIGS. 5A, 5B, 5C, and 5D illustrate example modification of audio content to reduce presence of voice commands.

In some implementations, reducing the presence of the voice command(s) within the audio content may include removing the voice command(s) from the audio content. For example, FIG. 5A illustrates audio content 502 having a progress length. The voice command may be located at an ending part of the progress length, and within a portion 504. The presence of the voice command within the audio content

502 may be reduced by removing the ending part of the progress length/the portion 504 of the audio content 502. In some implementations, different types of sounds within audio content may be stored separately. For instance, human voice may be stored in one audio track and other sounds may be stored in another audio track. The presence of the voice command within the audio content 502 may be reduced by removing the portion of the audio track(s) containing the voice command.

In some implementations, the audio content may have a progress length, and reducing the presence of the voice command(s) within the audio content may include removing one or more portions of the audio content including the voice command(s) responsive to the voice command(s) being located at a beginning part and/or an ending part of the progress length. That is, removal of the portion(s) of the audio content may be performed based on the voice command being located at the beginning and/or the end of the progress length. Such modification of the audio content may enable the modification component 108 to clip off terminal part(s) of the audio content based the voice command having been recorded at the beginning or the end of the capture duration.

In some implementations, the audio content may be further modified to include a fade-in effect based on the voice command(s) being located at the beginning part of the progress length and/or other information. A fade-in effect may refer to a gradual increase in volume and/or energy of the audio content/audio track including the voice command. The audio content/audio track may be gradually increased from low volume/energy (e.g., silence) so that the voice command is played back at low volume/energy.

Figure 5B:
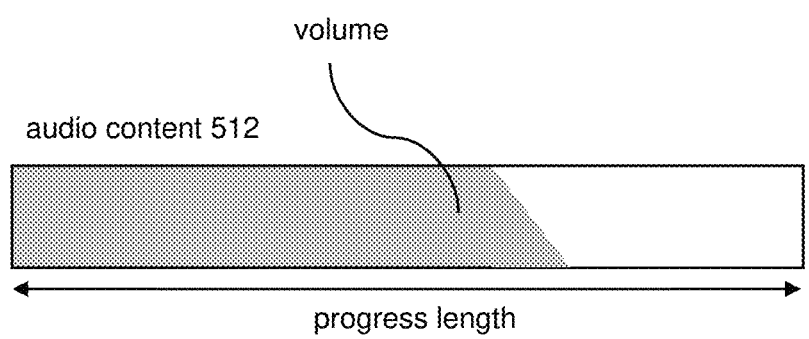

In some implementations, the audio content may be further modified to include a fade-out effect based on the voice command(s) being located at the ending part of the progress length. A fade-out effect may refer to a gradual decrease in volume and/or energy of the audio content/audio track including the voice command. The audio content/audio track may be gradually decreased to low volume/energy (e.g., silence) so that the voice command is played back at low volume/energy. For example, FIG. 5B illustrate audio content 512 having a progress length. The voice command may be located at an ending part of the progress length. Based on the location of the voice command at the ending part of the progress length, the presence of the voice command within the audio content 512 may be reduced by gradually decreasing the volume of the audio content 512/audio track including the voice command.

Figure 5C:
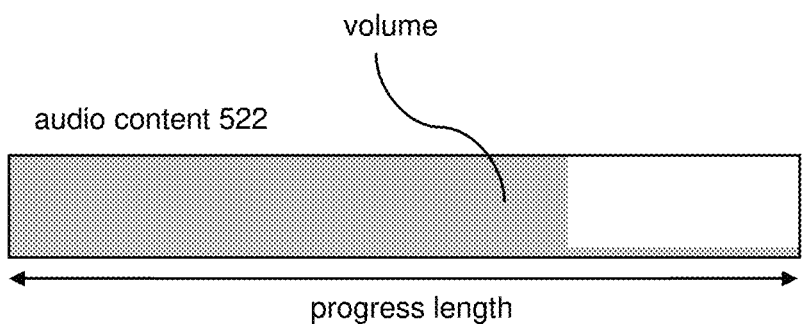

In some implementations, reducing the presence of the voice command(s) within the audio content may include reducing volume and/or energy of the voice command(s) within the audio content. For example, FIG. 5C illustrates audio content 522 having a progress length. The voice command may be located at an ending part of the progress length. The presence of the voice command within the audio content 522 may be reduced by reducing the volume of the corresponding portion of the audio content 522/audio track including the voice command.

Figure 5D:
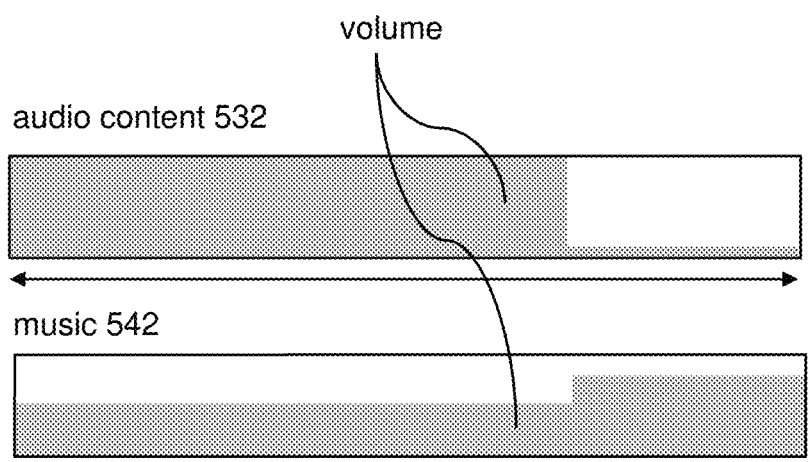

In some implementations, reducing the presence of the voice command(s) within the audio content may include increasing volume and/or energy of music for the video. For example, music may be provided to accompany the presentation of the video content, and the volume/energy portion of the music that will accompany the moment at which the voice command is located may be increased to mask the voice command. In some implementations, reducing the presence of the voice command(s) within the audio content may include reducing volume and/or energy of the audio content while maintaining or increasing volume and/or energy of music for the video. The presence of a voice command within the audio content may be reduced by both reducing volume and/or energy of the audio content/audio track and by increasing the volume and/or energy of the accompanying music. For example, FIG. 5D illustrates audio content 532 having a progress length. The voice command may be located at an ending part of the progress length. The presence of the voice command within the audio content 532 may be reduced by both (1) reducing the volume of the corresponding portion of the audio content 532/audio track including the voice command, and (2) increasing the volume of the corresponding portion of music 542 that provides accompaniment for the video content (e.g., soundtrack).

In some implementations, the presence of the voice commands within the audio content may be reduced based on the type of the voice commands. Types of voice commands may be associated with types of voice command presence reduction, and the particular type of modification made to the audio content may depend on the type of voice command recorded within the audio content. For example, different voice commands may be associated with different voice command presence reduction techniques. The type of voice commands (e.g., particular voice command, capture operation voice command vs change in capture operation voice command) within the audio content may be identified, and the presence of the voice commands may be reduced by using the corresponding presence reduction techniques.

The generation component 110 may be configured to generate video content of one or more videos. The generation component 110 may generate the video content based on the visual content, the modified audio content, and/or other information. For example, the video content generated by the generation component 110 may include the visual content, the modified audio content, and/or other content. The video content may define visual content viewable as a function of progress through a progress length of the video content. The visual content may be defined within one or more video frames of the video content. The visual content defined by the visual information may form the visual content of the video frame(s) of the video content. The visual content defined by the visual information may be used to generate the visual content of the video frame(s) of the video content. The modified audio content may provide audio for playback of the visual content. The modified audio content may span the entire duration of the progress length of the video or for one or more portions of the progress length of the video. Using the modified audio content to generate the video content may enable generation of video content with reduced presence of voice command(s) recorded during capture of the visual content and the audio content for the video. Playback of such video content may not include the voice command or may include the voice command at lower volume/energy.

The generation component 110 may be configured effectuate storage of the video content and/or other information in one or more storage media. For example, the video content (video file, director track) may be stored in the electronic storage 13, remote storage locations (storage media located at/accessible through a server), and/or other locations. In some implementations, the generation component 110 may effectuate storage of the video content through one or more intermediary devices. For example, the processor 11 may be located within a computing device without a connection to the storage device (e.g., the computing device lacks WiFi/cellular connection to the storage device). The generation component 110 may effectuate storage of the video content through another device that has the necessary connection (e.g., the computing device using a WiFi/cellular connection of a paired mobile device, such as a smartphone, tablet, laptop, to store information in one or more storage media). Other storage locations for and storage of the video content are contemplated.

While the present disclosure is described with respect to reducing presence of voice command within audio content, the present disclosure may be applied to reduce other types of sound within audio content. For example, the disclosure herein may be utilized to reduce other sound associated with operation of image capture device within audio content. For instance, the image capture device may produce sounds during operation, such as beeps, tones, vibration (e.g., from a haptic motor), and/or other sounds. For example, the image capture device may produce such sounds to notify the user about operations being performed by the image capture device. Sound associated with operation(s) of the image capture device may be located within the audio content. The audio content may be modified to reduce presence of the sound within the audio content. The types/qualities of and/or timing of such sound may be known, and information about the types/qualities and/or the timing of the sounds may be used to locate and/or reduced the presence of such sound within the audio content. Modification of the audio content to reduce presence of other types of sound is contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
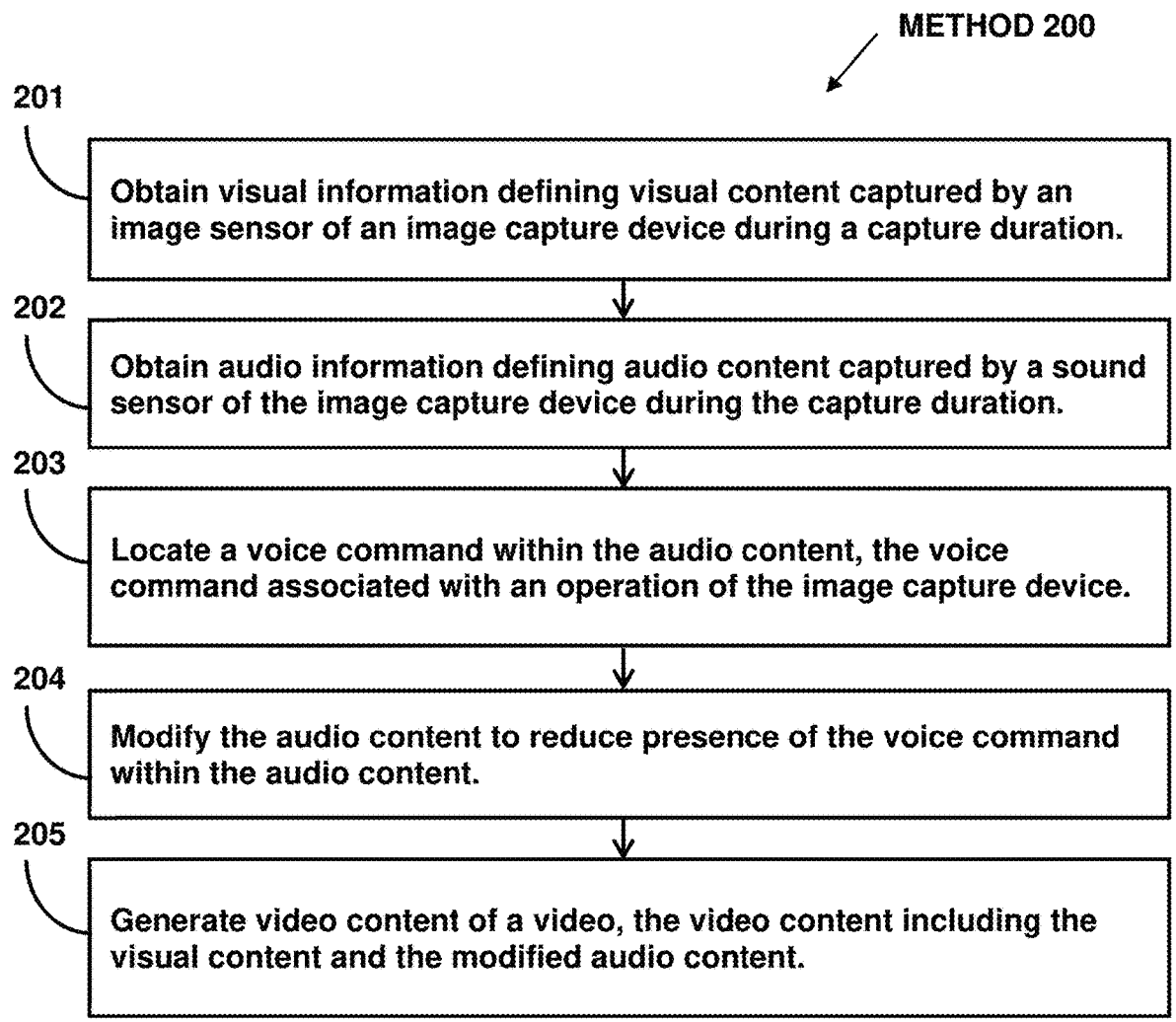
FIG. 2 illustrates an example method for removing commands from sound recordings.

FIG. 2 illustrates method 200 for removing commands from sound recordings. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information and/or other information may be obtained. The visual information may define visual content captured by an image sensor of an image capture device during a capture duration. In some implementation, operation 201 may be performed by a processor component the same as or similar to the visual information component 102 (Shown in FIG. 1 and described herein).

At operation 202, audio information and/or other information may be obtained. The audio information may define audio content captured by a sound sensor of the image capture device during the capture duration. In some implementation, operation 202 may be performed by a processor component the same as or similar to the audio information component 104 (Shown in FIG. 1 and described herein).

At operation 203, a voice command may be located within the audio content. The voice command may be associated with an operation of the image capture device. In some implementation, operation 203 may be performed by a processor component the same as or similar to the voice command component 106 (Shown in FIG. 1 and described herein).

At operation 204, the audio content may be modified to reduce presence of the voice command within the audio content. In some implementation, operation 204 may be performed by a processor component the same as or similar to the modification component 108 (Shown in FIG. 1 and described herein).

At operation 205, video content of a video may be generated. The video content may include the visual content and the modified audio content. In some implementation, operation 205 may be performed by a processor component the same as or similar to the generation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for removing commands from sound recordings, the system comprising:
one or more physical processors configured by machine-readable instructions to:
obtain visual information defining visual content captured by an image sensor of an image capture device during a capture duration;
obtain audio information defining audio content and music to provide accompaniment for presentation of the visual content, the audio content including sound captured by a sound sensor of the image capture device during the capture duration;
locate a first moment within the audio content that includes a voice command, the voice command associated with an operation of the image capture device, the first moment corresponding to a second moment within the music;
modify the audio content to reduce presence of the voice command within the audio content by reducing volume or energy of the audio content at the first moment, wherein volume or energy of the music at the second moment corresponding to the first moment is maintained or increased; and
generate video content of a video, the video content including the visual content and the modified audio content.

2. The system of claim 1, wherein the presence of the voice command within the audio content is reduced based on filtering.

3. The system of claim 1, wherein reducing the presence of the voice command within the audio content further includes removing the voice command from the audio content.

4. The system of claim 1, wherein reducing the presence of the voice command within the audio content further includes reducing volume or energy of the voice command within the audio content.

5. The system of claim 1, wherein the audio content has a progress length, and, responsive to the first moment of the audio content that includes the voice command being located at a beginning part or an ending part of the progress length, the first moment of the audio content is removed from the audio content.

6. The system of claim 1, wherein the audio content has a progress length, and the audio content is further modified to include a fade-in effect based on the first moment of the audio content that includes the voice command being located at a beginning part of the progress length and a fade-out effect based on the first moment of the audio content that includes the voice command being located at an ending part of the progress length.

7. The system of claim 1, wherein the voice command causes a capture operation of the image capture device.

8. The system of claim 1, wherein the voice command causes a change in a capture operation of the image capture device.

9. The system of claim 1, wherein the voice command causes a highlight tag to be generated by the image capture device.

10. A method for removing commands from sound recordings, the method performed by a computing system including one or more processors, the method comprising:
obtaining, by the computing system, visual information defining visual content captured by an image sensor of an image capture device during a capture duration;
obtaining, by the computing system, audio information defining audio content and music to provide accompaniment for presentation of the visual content, the audio content including sound captured by a sound sensor of the image capture device during the capture duration;
locating, by the computing system, a first moment within the audio content that includes a voice command, the voice command associated with an operation of the image capture device, the first moment corresponding to a second moment within the music;
modifying, by the computing system, the audio content to reduce presence of the voice command within the audio content by reducing volume or energy of the audio content at the first moment, wherein volume or energy of the music at the second moment corresponding to the first moment is maintained or increased; and
generating, by the computing system, video content of a video, the video content including the visual content and the modified audio content.

11. The method of claim 10, wherein the presence of the voice command within the audio content is reduced based on filtering.

12. The method of claim 10, wherein reducing the presence of the voice command within the audio content further includes removing the voice command from the audio content.

13. The method of claim 10, wherein reducing the presence of the voice command within the audio content further includes reducing volume or energy of the voice command within the audio content.

14. The method of claim 10, wherein the audio content has a progress length, and, responsive to the first moment of the audio content that includes the voice command being located at a beginning part or an ending part of the progress length, the first moment of the audio content is removed from the audio content.

15. The method of claim 10, wherein the audio content has a progress length, and the audio content is further modified to include a fade-in effect based on the first moment of the audio content that includes the voice command being located at a beginning part of the progress length and a fade-out effect based on the first moment of the audio content that includes the voice command being located at an ending part of the progress length.

16. The method of claim 10, wherein the voice command causes a capture operation of the image capture device.

17. The method of claim 10, wherein the voice command causes a change in a capture operation of the image capture device.

18. The method of claim 10, wherein the voice command causes a highlight tag to be generated by the image capture device.

19. A system for removing commands from sound recordings, the system comprising:
one or more physical processors configured by machine-readable instructions to:
obtain visual information defining visual content captured by an image sensor of an image capture device during a capture duration;
obtain audio information defining audio content and music to provide accompaniment for presentation of the visual content, the audio content including sound captured by a sound sensor of the image capture device during the capture duration;
locate a first moment within the audio content that includes a voice command, the voice command associated with an operation of the image capture device, the first moment corresponding to a second moment within the music, wherein the voice command causes a capture operation of the image capture device, causes a change in the capture operation of the image capture device, or causes a highlight tag to be generated by the image capture device;
modify the audio content to reduce presence of the voice command within the audio content by reducing volume or energy of the audio content at the first moment, wherein volume or energy of the music at the second moment corresponding to the first moment is maintained or increased; and
generate video content of a video, the video content including the visual content and the modified audio content.

20. The system of claim 19, wherein the audio content has a progress length, and the audio content is further modified to:
responsive to the first moment of the audio content that includes the voice command being located at a beginning part of the progress length, remove the first moment of the audio content from the audio content or include a fade-in effect; and
responsive to the first moment of the audio content that includes the voice command being located at an ending part of the progress length, remove the first moment of the audio content from the audio content or include a fade-out effect.

* * * * *